United States Patent
Roberts et al.

(10) Patent No.: US 6,518,767 B1
(45) Date of Patent: Feb. 11, 2003

(54) LINE DIFFERENTIAL PROTECTION SYSTEM FOR A POWER TRANSMISSION LINE

(75) Inventors: Jeffrey B. Roberts, Viola, ID (US); Gabriel Benmouyal, Boucherville (CA); Hector Altuve-Ferrer, Nuevo Leon (MX); Ralph Folkers, Pullman, WA (US); Demetrios Tziouvaras, Vacaville, CA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 09/693,669

(22) Filed: Oct. 19, 2000

(51) Int. Cl.⁷ .................. G01R 31/08; G01R 31/00; H02H 3/18
(52) U.S. Cl. .................. 324/521; 702/59; 361/80
(58) Field of Search .................. 324/521, 522, 324/107, 525, 512, 106, 108, 86; 702/59, 58; 361/80, 81

(56) References Cited

U.S. PATENT DOCUMENTS 4,841,405 A * 6/1989 Udren .................. 361/80
5,796,258 A * 8/1998 Yang .................. 324/521
6,148,267 A * 11/2000 Premerlani .................. 324/521
6,256,592 B1 * 7/2001 Roberts et al. .................. 324/512

* cited by examiner

*Primary Examiner*—Christine Oda
*Assistant Examiner*—James Kerveros
(74) *Attorney, Agent, or Firm*—Jensen & Puntigam, P.S.

(57) ABSTRACT

In a power line current differential protection system, all three phase current values ($I_A$, $I_B$ and $I_C$) are obtained from both the local end and the remote end of a power transmission line. The magnitude of the ratio of the remote current values to the local current values are calculated. Also, the angle difference between the local and the remote current values for each phase are calculated. Comparison elements then compare the ratio and angle values against preselected values which establish a restrain region in the current ratio plane. Current values which result in the ratio being within the region do not result in a tripping signal for the circuit breaker on the power transmission line, while current values which result in a ratio outside of the region result in a tripping of the circuit breaker. Similar circuitry is used for negative sequence current quantities, with the negative sequence preselected values being set substantially lower to produce a more sensitive response to possible faults in the line.

28 Claims, 6 Drawing Sheets

FAULT

LINE DIFFERENTIAL PROTECTION SYSTEM FOR A POWER TRANSMISSION LINE

TECHNICAL FIELD

This invention relates generally to power transmission line protection systems, and more specifically concerns a line differential protection system for power transmission lines.

BACKGROUND OF THE INVENTION

Modern power systems typically require high speed fault clearing to preserve the transient (short term) stability of the system and to provide better power quality by reduction in reduced voltage (voltage sag) duration. The most widely used fault protection systems satisfying such requirements for transmission lines, i.e. those power lines with nominal voltages of 115 KV and greater, are directional protection systems using directional comparison techniques. While the directional comparison approach has some advantages, including low channel (communication) requirements between relays positioned at the local and remote ends of the power line, along with inherent redundancy, it does require voltage values obtained from the power signal on the power line. Such systems experience problems (often severe problems) because of voltage errors or missing voltages caused by small voltage factors, including blown fuses in the system, problems with windings in the system voltage transformer (VT) devices and transient responses in the system capacitive coupled voltage transformers.

One alternative to directional comparison systems using voltage values is a current differential system, which uses only the electrical current value information from the power line. Current differential systems, also known as line differential systems, do not require voltage measuring devices, as they do not use voltage values in their fault determinations. Line differential systems are less sensitive to power swings and sudden load changes in the system and are generally less sensitive to or even immune from certain conditions on the line, including zero sequence mutual coupling effects and/or current reversals, among others. However, along with the advantages are several significant disadvantages, including reliance on high communication channel performance, which is required between the local and remote protective relays on the line. In addition, conventional line differential systems using phase current quantities are limited in their ground fault resistance coverage and also are a compromise to an extent in security under current transformer (CT) saturation conditions.

The present invention is a new line differential protection system which, while still dependent upon a communication channel, includes significant improvements relative to other system considerations, including high fault resistance coverage, improved operating characteristics and sensitivity, while at the same time maintaining power system security.

DISCLOSURE OF THE INVENTION

Accordingly, the present invention is a system for current differential protection for a power transmission line comprising: means for determining the phase current values at local and remote ends of a transmission line; means for calculating the magnitude value of the ratio of the remote phase current values and the local phase current values and for calculating the angle difference value between the remote current and local current values; comparison elements for comparing the ratio magnitude value and the angle value against preselected values which establish a phase region in a current ratio plane for restraining tripping of a circuit breaker for the transmission line, wherein when the magnitude value and angle value are not within the established phase region, an output signal is developed which is a tripping signal for the circuit breaker and wherein when the magnitude value or the angle value are within the established region, no trip signal is produced; means for determining a selected one of (1) negative sequence current values and (2) zero sequence current values at local and remote ends of the transmission lines; means for calculating the magnitude value of the ratio of the remote selected sequence current values and the local selected sequence current values; means for calculating the angle difference value between the local and remote selected sequence current values; and comparison elements for comparing the ratio magnitude value and the angle value against preselected values which establish a selected sequence restraint region in the current ratio plane, wherein when the ratio magnitude value and angle value are outside of the sequence region, an output signal is developed which is a tripping signal for the circuit breaker and wherein when the ratio magnitude value or the angle value are within the sequence region no trip signal is produced.

In a related aspect of the invention, the positive sequence current values are substituted for the phase current values and used in combination with the negative sequence current values with a selected one of the negative sequence current values and zero sequence current values.

BEAT MODE FOR CARRYING OUT THE INVENTION

Figure 1:
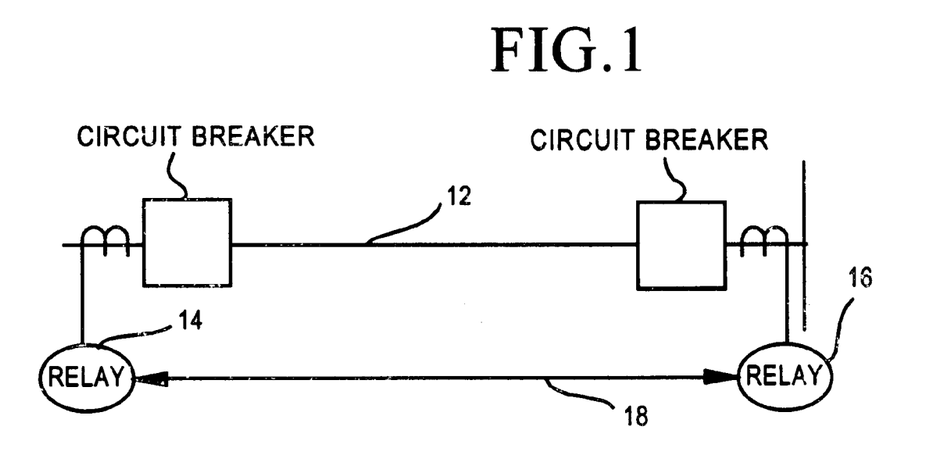
FIG. 1 is a simplified diagram showing a differential protection system for a power transmission line.

As indicated above, line differential protection systems are one type of several different protection arrangements possible for use with power transmission lines. In the line differential approach, a protective relay is located at each end of the protected line. In FIG. 1, for instance, a transmission line 12 has protective relays 14, 16 at opposing ends thereof. Circuit breakers 15 and 17 are associated, respectively, with relays 14 and 16. The communication between the relays is accomplished by a communication line 18 which could be a fiber optic cable or other communication medium. In operation, each relay 14, 16 measures line current values at its end of the protected line and transmits those values to the relay at the other end of the line. The local protective relay (relay 14 is referred to as the "local" relay in FIG. 1) will combine the currents it measures with the line current values from the remote relay. The sum of the current values will be zero when the fault is external (the fault is on a different line) to the protected line, while internal faults (on the protected line) will result in a non-zero combined current.

Figure 2A:
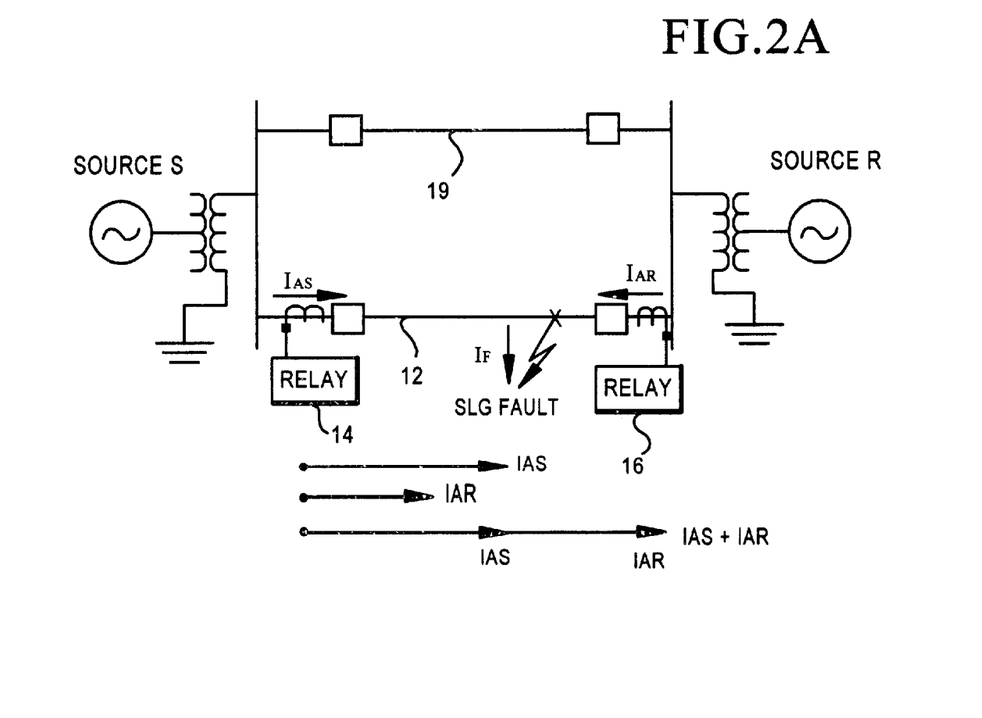
FIGS. 2A and 2B are diagrams illustrating current flow in a power transmission line for internal and external faults, viewed from the standpoint of the protection for line 1.
Figure 2B:
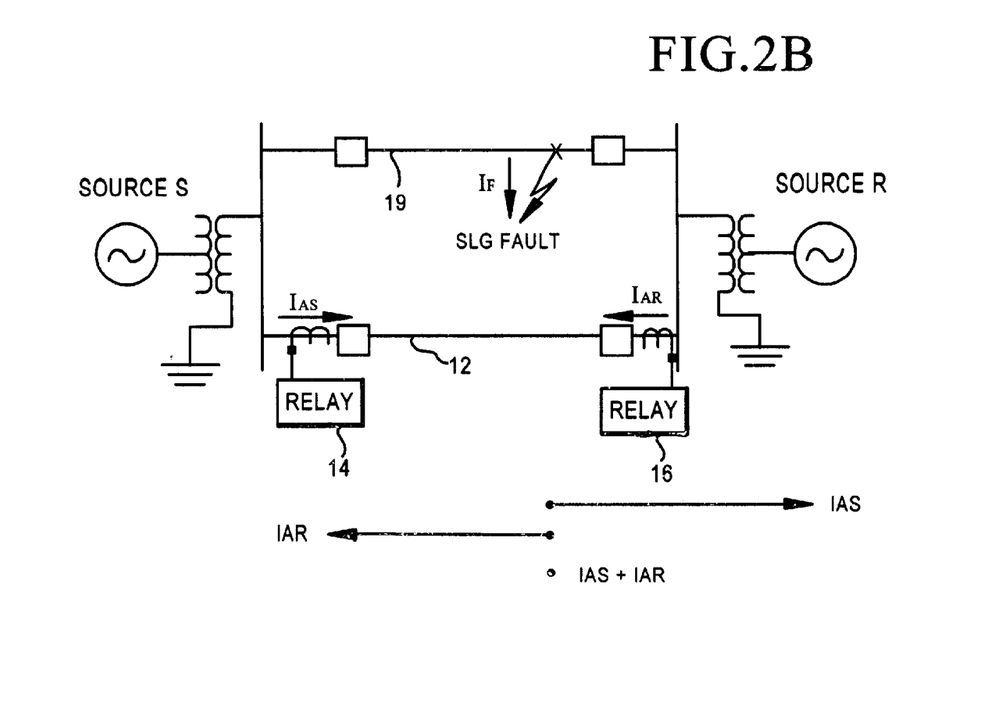

FIGS. 2a and 2b show transmission line diagrams, with current flow, for internal (line 12) and external (line 19) faults, respectively, which demonstrate the principle that external faults add to zero, while internal faults produce a non-zero combined current.

Figure 3:
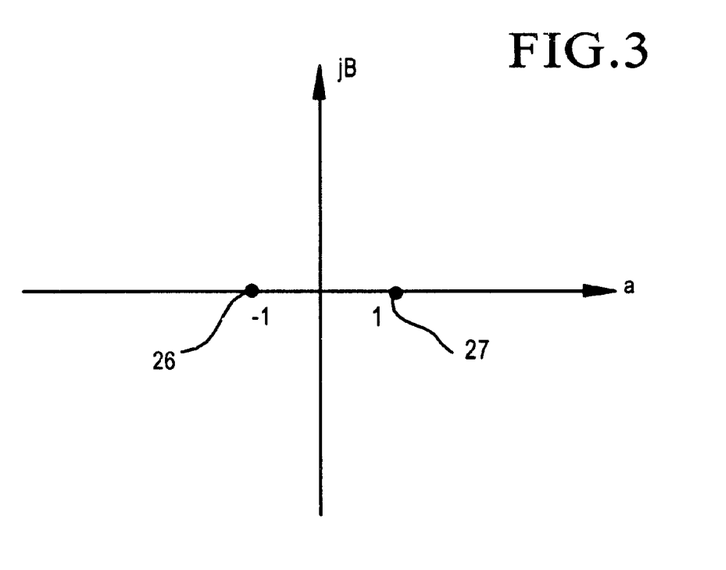
FIG. 3 is a diagram showing a current ratio plane with an ideal characteristic point for an out-of-section (external) fault or through load.

In the determination of faults on a transmission line using a line differential approach using electrical current values from opposing ends of the line, a current ratio characteristic or point is calculated and located in what is known as the current ratio plane, also known as the alpha plane, which is a graphical representation of the vector ratio of remote current ($I_R$) to local current ($I_L$). The current ratio plane or alpha plane is a well-known concept, explained in the book titled "*Protective Relays-Their Theory and Practice*", by A. R. van C. Warrington, Chapman and Hall Ltd (1971), the relevant portion of which is hereby incorporated by reference. Line current values from the remote relay and the local relay are combined into a ratio of current values. This ratio has a magnitude and angle. This ratio can be plotted on the current ratio plane. Current flowing into the protected line is defined as positive (zero angle) at both terminals (line end points). FIG. 3 is a simplified diagram of an alpha (current ratio) plane. The labels for the two axes of the plane, a and jb, are derived as follows:

$$\frac{\vec{I_R}}{\vec{I_L}} = re^{j\theta} = a + jb$$

$$a = \text{Re}\left(\frac{\vec{I_R}}{\vec{I_L}}\right)$$

$$b = \text{Im}\left(\frac{\vec{I_R}}{\vec{I_R}}\right)$$

where Re and Im refer to the real and imaginary parts of the current ratio.

Ideally, load current appears in equal but opposite values at the two relays, so for load current and external faults, $$\frac{I_R}{I_L} = 1\angle 180°$$

which is represented by the point labeled 26 in FIG. 3.

With respect to internal faults, the fault current is equal at both ends of the line only when the line is homogenous and the contributions to the fault from both ends of the line are equal, e.g. when the two sources have equal strength and the fault is at the mid-point of the line. In such a case, $$\frac{I_R}{I_L}$$

is equal to $1\angle 0°$. However, as the internal fault moves toward the local relay, $I_L$ will increase and point 27 in the alpha plane will move toward the origin when viewed from the local relay (relay 14 in FIG. 2). For large remote currents, when compared to the local current, the point will move away from the origin, as viewed from the local relay.

As the fault moves away from the local relay, $I_L$ will decrease and the point will move.

Various system factors, including non-homogenous power systems, will cause the angle of the fault current in the alpha plane at each terminal to be different, which results in the ratio point for an external fault to move up or down in the alpha plane along an arc which moves through the "a" axis.

It should be understood that a separate alpha plane representation will exist for each of the three phase currents $I_A$, $I_B$ and $I_C$, and for each of the three sequence current quantities (zero sequence, positive sequence and negative sequence). Various other factors, including line measurement errors, line charging current, CT (current transformer) saturation effects, transient effects in the power system compensation capacitors, digital filter transient response and other aspects of the relay system can cause the ratio of $$\frac{I_R}{I_L}$$

for external faults to move away from point 26 shown in FIG. 3. For internal faults, such factors will result in the $$\frac{I_R}{I_L}$$

ratio moving around on the alpha plane.

The movement from point 26 in the alpha plane for external faults i.e. from the ideal external fault or load, complicates the line differential system's decision in (1) declaring a fault on the protected line and tripping the associated circuit breaker on the line or (2) restraining the fault declaring action because the current ratio is due to load or an external fault or to system factors and/or errors. There is a region defined in the alpha plane which is a "restrain" region and a region which is an "operate" (trip) region, to enable appropriate circuit decision making with respect to the restrain and operate options.

In the present invention, all of the points in the alpha plane which should not result in a trip action by the line differential element define a restrain region for which there is no trip signal, while the remaining portions in the alpha plane are in the operate region for which a trip signal is produced.

Figure 4:
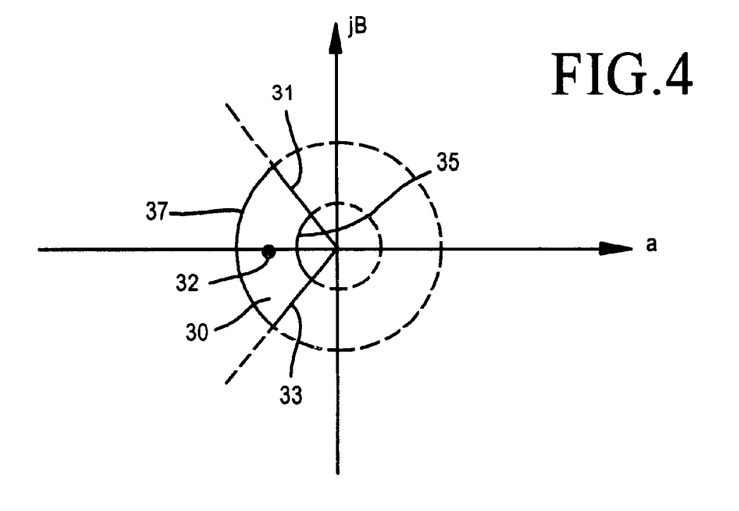
FIG. 4 is a diagram showing the current ratio plane operating characteristic of the system of the present invention.

FIG. 4 shows the restrain/operate regions used by the present invention in its fault determination decisions. The restrain region referred to at 30 in the alpha plane is centered on the ideal external fault point 32. The region 30 is defined first by current ratio angle (the radial lines 31 and 33 above and below the "a" axis), the range of which accommodates current ratio values affected by various system factors, including line charging current values, CT saturation and sample time and data alignment errors. Region 30 is further defined by the magnitude of the current ratio (the curved lines 35, 37), the range of which accommodates CT saturation and digital filter transient response, among other factors.

The logic circuitry of the present invention uses a series of logical comparisons and other functions to determine where the $I_R/I_L$ ratio is located in the alpha plane, and specifically whether the $I_R/I_L$ ratio is within the restrain region, in which case there is no trip signal. When the $I_R/I_L$ ratio is outside of the restrain region, into the operate region, a trip signal is produced if the measured current values have satisfied certain threshold and other characteristics.

As indicated above, there is a separate alpha plane representation for each phase of currents (Ia, Ib, Ic) and for each sequence current ($I_0$, $I_1$, $I_2$). In the present invention, alpha planes representations are used for all three phase currents (Ia, Ib and Ic). In this application, circuitry is shown and explained only for Ia phase current. The other phase currents (Ib, Ic) have identical associated logic circuits. In addition, negative sequence current values are used with a negative sequence alpha plane. The negative sequence portion increases the sensitivity of the overall system, particularly for unbalanced faults where the fault current is small. The use of negative sequence quantities, while providing better sensitivity than phase current elements, also includes security elements to prevent operation under erroneous conditions. The A phase, B phase and C phase circuits are included to provide tripping actions on three phase faults, while the negative sequence circuit is included for unbalanced faults.

The negative sequence circuit has significant benefits over other sequence circuits relative to out-of-section (external) faults with severe CT saturation. The use of negative sequence quantities provides higher ground fault resistive coverage for the protection system than the use of phase circuits alone. This is a desirable result, and also provides increased security during non-fault conditions. Unbalanced faults will produce negative sequence current in at least one line terminal for all internal faults. Hence, using the negative sequence quantities will result in detection of all unbalanced faults. Further, and quite importantly, thresholds for pickup action can be set at a very low level compared to the levels for the phase pickup action since the magnitude of negative sequence charging current is quite low. Typically, the difference between the negative sequence and phase charging currents will be 1/100 or even greater under steady state operating conditions. However, even a setting of 1/10 would be of great benefit.

Figure 5:
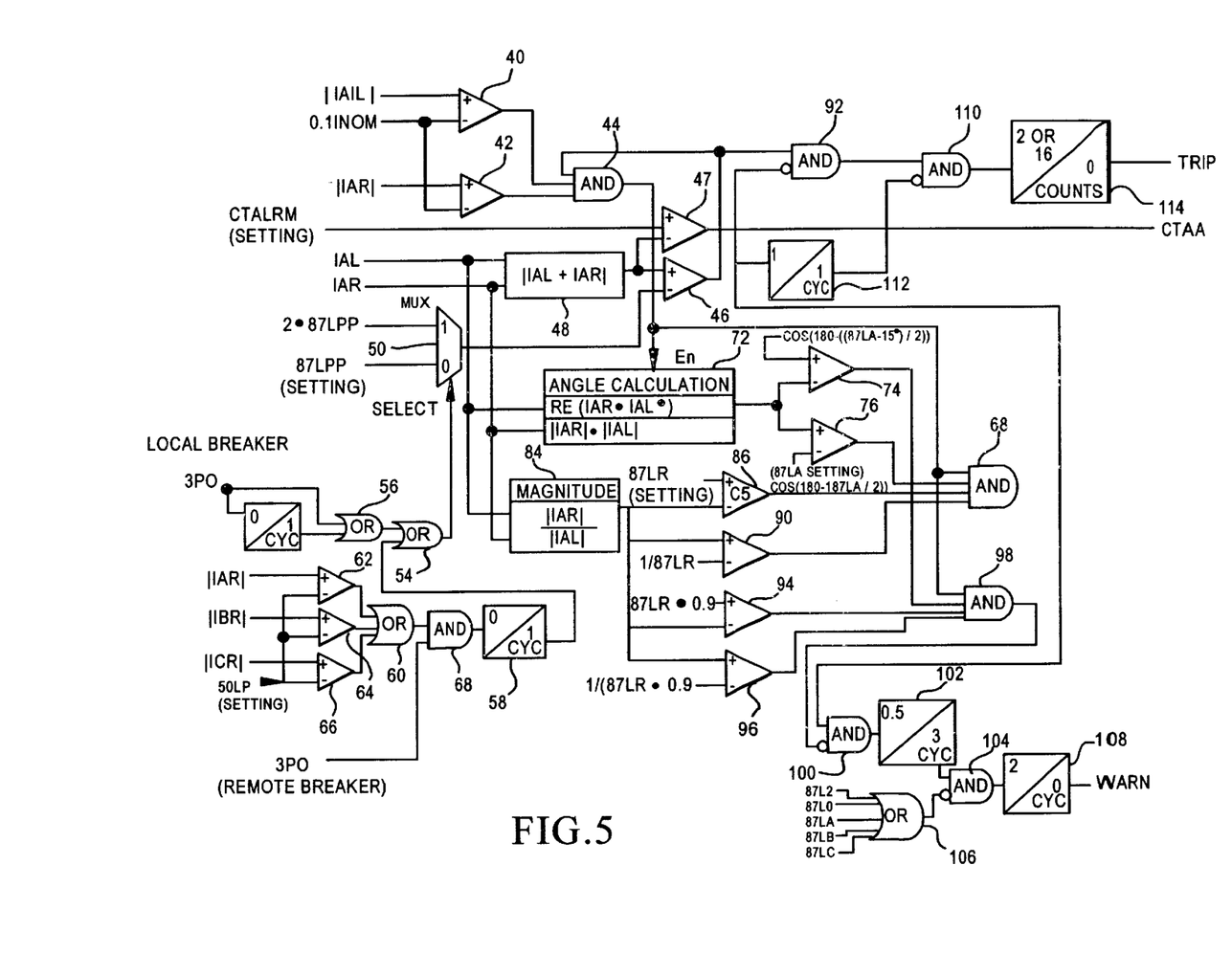
FIG. 5 is a logic diagram showing a first portion of the line differential system of the present invention.

FIG. 5 shows the logic circuit for the phase comparison portion of the line differential system of the present invention. FIG. 5 is for A phase current values. Similar logic diagrams can be used for B phase and C phase current values. Referring now to FIG. 5, comparator 40 compares the magnitude of the measured A phase current $I_{AL}$ at the local end of the power line against a selected threshold value, which in this case is 10% (0.1) of the nominal secondary current. This threshold provides assurance that the phase current has sufficient magnitude to have a reliable phase angle. Comparator 42 accomplishes the same function with respect to the remote current value obtained via the communication channel from the remote relay at the other end of the line.

AND gate 44 is responsive to the outputs of comparators 40 and 42, as well as the output of comparator 46. The function of comparator 46 is to enable the operation of the phase calculators when the sum (absolute value) of the magnitudes of local and remote currents $I_{AL}+I_{AR}$ is above a minimum threshold. The current summing function is accomplished by a summing circuit 41. The inputs to comparator 46 are provided by the current summing circuit 48 and a multiplexer element 50. The multiplexer element 50 will vary between two threshold current settings. A high output of comparator 46 establishes that a higher minimum sensitivity level has been exceeded.

The output of summing circuit 48 is also compared against a user settable CT alarm value. If the threshold is exceeded, a CTAA alarm signal is produced. The purpose of this comparison is to detect the situation where the user inadvertently leaves all three current inputs shorted around the relay (at one or more ends of the line).

The setting threshold for multiplexer 50 is above the maximum charging current for the power line. Charging current is the current which is necessary to charge the distributed line capacitors present in overhead and underground lines. The multiplexer threshold value, applied to comparator 46 will vary between the setting threshold at input 0 and a value which is twice the setting threshold, at input 1. The 0 or 1 threshold is selected by the output of OR gate 54, which is responsive to the output of OR gate 56 and timer 58.

The absolute values of the A phase, B phase and C phase currents from the remote relay are applied to comparators 62, 64 and 66, respectively, which compares those values against a single threshold setting selected by the user. This establishes minimum current values for the remote relay. A default setting in the embodiment shown is 0.1 amps. This setting value can be varied. The output of OR gate 60 is high if any of the outputs of comparators 62, 64 and 66 are high. The output of OR gate 60 is applied to one input of AND gate 68. The other input to AND gate 68 is a signal from the remote circuit breaker status logic, i.e. the circuit breaker at the remote end of the power line. The signal on this line is high if the breaker is open at the time. The output of AND gate 68 is applied to the input of timer 58, which is an edge triggered, instantaneous pickup, one cycle time-delayed dropout timer. The output of timer 58 goes high on the rising edge of the output of AND gate 68.

The output from timer 58 will remain high for one cycle following the termination of the high output from AND gate 68. The output from timer 58 is applied to OR gate 54. The output from OR gate 54, as indicated above, controls the setting of multiplexer 50, i.e. whether it is the user set value or twice that value. A high signal from OR gate 54 indicates a possible line energization; this causes the output of multiplexer 50 to be set to its high threshold value. The same function is true for the output from OR gate 56, which is responsive to a signal from the local circuit breaker status logic and the operation of timer 69.

The output of AND gate 44 is applied to an angle calculation circuit 72. As indicated above, the output of AND gate 44 is high when the output from comparator 46 is high, as well as the output of comparators 40 and 42, basically indicating that the local and remote current values are high enough that their angles can be relied upon for fault determination. The angle calculation circuit 72 implements the following calculation, using the A phase current phasors $I_{AL}$ and $I_{AR}$.

$$angle = \frac{\text{Re}\,[I_{AR} \cdot I_{AL}^*]}{|I_{AR}| \cdot |I_{AL}|}$$

The result of this calculation is a value representative of the angle between the local and remote currents, the value being a positive maximum when $I_{AL}$ and $I_{AR}$ are in phase (the angle difference is zero), a negative maximum when $I_{AL}$ and $I_{AR}$ are 180° out of phase and zero when $I_{AL}$ and $I_{AR}$ are in quadature (i.e. ±90° out of phase). The value from circuit 72 is applied to two comparators 74 and 76. In these comparators, the angle value is compared against threshold values. In comparator 76, the threshold value is:

$$\cos\left[180° - \left(\frac{87LA}{2}\right)\right]$$

The value 87LA is a designation for the range of angle through the "a" axis on the alpha plane within which a restrain action is indicated. The purpose of comparator 76 is to determine whether the angle of the current difference between $I_R$ and $I_L$ is within the angular restraint range established by the threshold value. If the $$\frac{I_R}{I_L}$$

angle difference lies within the angle range, the output of comparator 76 will be high, indicating a possible restrain condition for the A phase element portion of the system.

In comparator 74, the threshold value is:

$$\cos\left[180° - \left(\frac{87LA - 15°}{2}\right)\right]$$

This threshold angle is typically set somewhat smaller than the restrain region defined by the threshold setting value used in of comparator 76. This establishes the angle part of a quality boundary region within the restrain region. If the determined angle value is at a point near the boundary of the restrain region defined by the setting value of comparator 76, but still within the restrain region so that the relay does not trip the circuit breaker, the user should be notified that the protection boundary is close. This "boundary" angle can be varied, such as in the range of 5° and 25°.

The current values from the remote and local terminals for A phase current ($I_{AL}$ and $I_{AR}$) are also applied to a magnitude circuit 84. In magnitude circuit 84, the absolute magnitude values of the two current values $I_L$ and $I_R$ are used to determine a current magnitude ratio $I_{AR}/I_{AL}$. The output of circuit 84 is applied as one input to four comparators. In comparator 86, the output of magnitude circuit 84 is compared against a first setting value (87LR in FIG. 5), which is a designation for the setting for the outer radius line 37 of the restrain region in the alpha plane of FIG. 4. If the $$\frac{I_R}{I_L}$$

ratio value is less than the setting value, the output of comparator 86 is high. If it is greater than the setting value, it is low. The output of comparator 86 forms part of the security blocking logic (restrain) of the present invention.

The output of magnitude circuit 84 is also applied to comparator 90, where it is compared against the inverse of the setting value of comparator 86; this is the setting which establishes the inner radius line 35 for the restrain region. If the output value of magnitude circuit 84 is greater than the setting value, the output of comparator 90 is high. Otherwise, the output is low.

The output of comparators 86 and 90 are both applied to AND gate 68, along with the output of comparator 76 and the output of AND gate 44. A high output from AND gate 68 indicates that the overall fault determination circuit system is enabled under the above-described threshold security thresholds, and that the current ratio value is between the two established radius boundaries of the restrain region. This output from AND gate 68 is applied to an inverting input of AND gate 92.

The output of magnitude circuit 84 is also applied as one input to comparator 94. The other input to comparator 94 is a setting value which is equal to 90% (0.9) of the setting value of comparator 86. This could be varied, in the range of 75% and 95%. If the magnitude value is less than the threshold, i.e. less than 90% of the outer radius of the restrain region set by the setting value (threshold) of comparator 86, then the output of comparator 94 is high.

Otherwise, it is low. This logic (comparator 94) establishes the outer radius part of the quality boundary area within the restrain region.

Lastly, the output of magnitude circuit 84 is applied to a comparator 96 where it is compared against a setting value of approximately 110% (1.1) of the setting value for comparator 90. This could also be varied to some extent. The output of comparator 96 will be high when the magnitude value of $$\frac{I_R}{I_L}$$

is greater than the setting value. This, establishes the inner radius part of the quality boundary area within the restraint region, slightly to the left from the inner radius value in FIG. 4.

The outputs of comparators 94 and 96 are applied as inputs to AND gate 98, along with the output from comparator 74 (which establishes the quality boundary area for the angle part of the restrain region) and the enable output from AND gate 44.

When the inputs to AND gate 68 are all high, meaning (1) that the remote and local current values are above minimum values (the output of AND gate 44 thus being high); and (2) the ratio of the currents fits within the restrain region of the current ratio plane, as defined by the angle determination from comparator 76 and the radius determination from comparators 86 and 90, the output thereof will be high, indicating that the line condition is possibly within the restrain region. The output of AND gate 98 is applied to one input of AND gate 100.

Further, when all of the inputs to AND gate 98 are high, indicating (1) that the local and remote currents are above minimum values and (2) that the angle and radius determinations are within the "nested" area defined by the quality boundary within the restrain region, as determined by comparators 94 and 96, the output of AND gate 98 is high. The output of AND gate 98 is applied to an inverting input of AND gate 100. The output of AND gate 100 will be low under such conditions and no alarm is provided (the relay's tripping action is thus restrained). When, however, one of the inputs to AND gate 98 is low, while all inputs to AND gate 68 are high, indicating a boundary location for the ratio of either angle or radius or both, within the restrain region, then the output of AND gate 100 goes high.

The high output of AND gate 100 is applied to a timer 102 which picks up after 0.5 cycles and has a time-delay dropout of three cycles. Hence, a high output condition for AND gate 100 must be true for at least 0.5 power cycles and must remain high for three power cycles after the output from AND gate 100 goes low. The output from timer 102 is applied to AND gate 104. Applied to an inverting input of AND gate 104 is an output of OR gate 106, the inputs of which are all of the other line differential elements, designated 87L2, 87L0, 87LA, 87LB, and 87LC, specifically the zero sequence and negative sequence elements and the phase elements for phases A, B and C. If any one of those elements have been picked up, the output of OR gate 106 will be high, and the output of AND gate 104 will be low. No warning signal is thus provided under that condition.

The output of AND gate 104 will thus be high when no other element has been picked up and the ratio of $$\frac{I_R}{I_L}$$

lies within the quality boundary region within the restrain region for at least 0.5 cycles and that this condition was present during the last three cycles. The high output from AND gate 104 is applied to a two-cycle security timer 108. The high output from timer 108 is a warning signal which indicates to the user that the system condition is close to a tripping condition, but that a trip is still being restrained.

As indicated above, the output of AND gate 68 is high when the ratio $$\frac{I_R}{I_L}$$

lies inside the restrain region and the $I_R/I_L$ current satisfies the threshold requirements. The output of AND gate 68 is applied to an inverting input of AND gate 92, along with the signal from comparator 46 (the operation of which was explained above). The output of AND gate 92 will be high only when the output of AND gate 68 is low, indicating that the $I_R/I_L$ ratio is outside of the restrain region, either from an angle or radius perspective.

The output from AND gate 68 is also applied to a one-cycle time-delayed pickup (TDPU), one-cycle time-delayed dropout (TDDO) timer 112. Timer 112 provides the overall circuitry of FIG. 5, a measure of CT (current transformer) saturation security following the clearance of an external fault (a fault on an adjacent line), where the CT at one end of the line saturates while the CT at the other end does not. The high condition of the output of AND gate 68 must be true for at least one cycle and must be present previously for at least the past one cycle to satisfy timer 112. The output from timer 112 is applied to an inverting input of AND gate 110. The output from AND gate 110 is applied to a timer 114. Timer 114 has at least two possible values in the embodiment shown, although there could be more or fewer. The two values in this embodiment are a two-count pickup or 16-count pickup, with each count being 1/16 of a power system cycle.

The output of timer 114 will be high when the $I_R$ and $I_L$ are above threshold levels and the CT has recovered sufficiently from saturation. Additional security is provided when the pickup of timer 114 is increased from two counts to 16 counts. The output of timer 114 is a trip signal for the circuit breaker; it indicates the presence of an $$\frac{I_R}{I_L}$$

ratio outside of the restraining region, with various security criteria having been satisfied.

The above logic circuit is, as indicated previously, for the A phase current portion of the phase differential comparison part of the system of the present invention. Similar circuits are provided for B phase and C phase comparisons.

Figure 6:
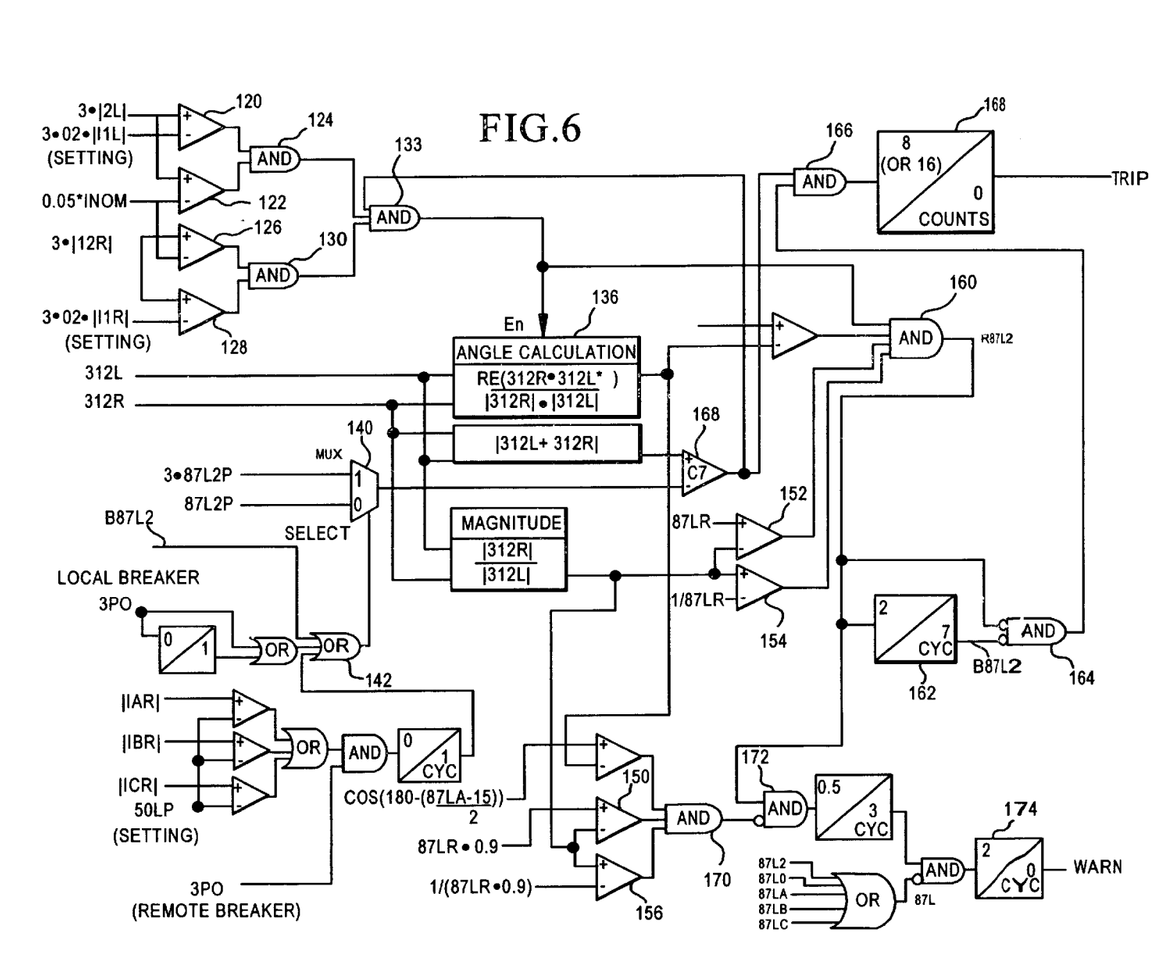
FIG. 6 is a logic diagram showing a second portion of the line differential system of the present invention.

In addition to the phase comparison operations, which are accomplished for all three phases, the present invention includes a negative sequence differential current circuit shown in FIG. 6. The negative sequence differential element is similar in many respects to the circuit of FIG. 5. However, instead of local and remote phase currents being used, local and remote negative sequence quantities are used (referred to as $3I_2$ quantities in FIG. 6).

The magnitudes of the negative sequence current quantities ($3I_{2L}$ and $3I_{2R}$) are compared against threshold values to ensure that the negative sequence currents have a reliable phase angle. A total of four comparisons are made. Comparators 120 and 122 are used with AND gate 124. The output of comparator 120 is high if the local negative sequence current ($3I_{2L}$) is greater than a setting of a·$3I_{1L}$, where $3I_{1L}$ is the positive sequence quantity from the local terminal. The "a" factor is usually within a range of 0.02–0.05, with a typical setting of 0.03 established to accommodate CT ratio errors.

In comparator 122, a comparison is made between the negative sequence current $3I_{2L}$ and a 0.05 nominal secondary current value, i.e. 5% of the nominal secondary current, which is typically either 1 amp or 5 amps depending on the CT used. The same comparisons are made for the remote negative sequence current quantities by comparators 126, 128. The output of comparators 126 and 128 are applied to AND gate 130, the output of which is applied to AND gate 133, along with the output of AND gate 124 and the output of comparator 168. The function of AND gate 133 is similar to AND gate 44 in FIG. 5.

Figure 7:
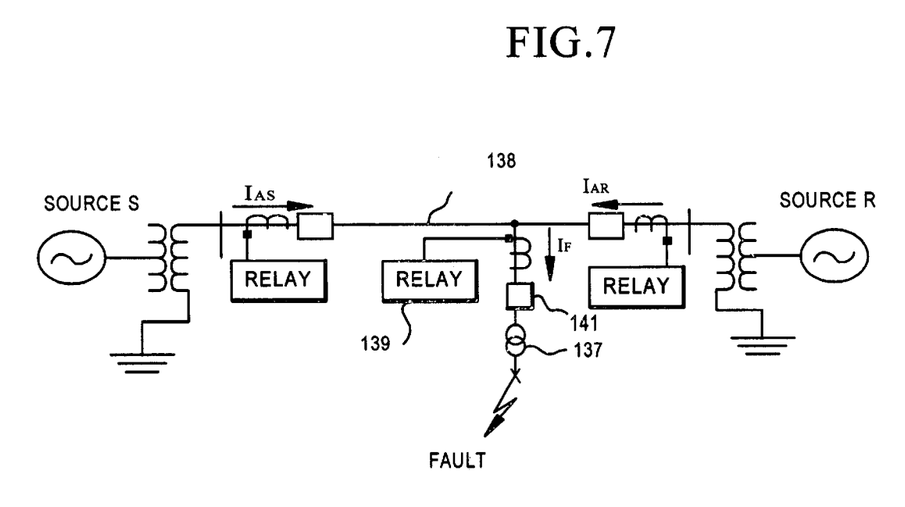
FIG. 7 is a diagram showing a typical load circuit.

Circuit 135 calculates the sum of the local and remote negative sequence currents $I_{2L}$ and $I_{2R}$. This same output is also useful as the input to a time-overcurrent (TOC) element. This element coordinates with a tapped load whose current is not included in the differential measurements. Because negative sequence charging current is negligible, this negative-sequence TOC element can be set very sensitively. As shown in FIG. 7, the tapped load transformer 137 extends from the protected line 138, between the local and remote relays. The tapped load transformer is protected by relay 139 and circuit breaker 141.

As compared with a phase TOC, the negative-sequence TOC element can sense much higher impedance ground faults located on the tapped transformer low-side. If the transformer is configured as delta-wye-grounded, a zero-sequence TOC cannot sense low-side ground faults, as the winding of the transformer blocks these currents from flowing in the high-voltage side of the power system.

If the transformer is configured as grounded-wye-delta, the negative-sequence TOC is more secure for out-of-section faults than a zero sequence TOC, as the grounded-wye acts like a unmeasured zero-sequence current source.

For the fault shown in FIG. 7, circuit 135 measures the total fault current flowing into the transformer. This same current is also measured by the transformer high-voltage side relay 139 or by a fuse protecting the transformer bank. Because the line-end relay measures the same current as the tapped load transformer protection, direct time coordination can be readily accomplished. If the fault is instead on the protected line, the time-overcurrent element undesirably delays high-speed tripping. To overcome this disadvantage, a high-set overcurrent element (operating from total line current) is included to by-pass the time-overcurrent element. This solution is very effective in many applications as the difference in fault duty between transformer high-side and low-side faults is appreciable. In those applications where the strength of Source S or Source R or both changes appreciably, a distance element can be used instead of the high-set overcurrent.

Referring again to FIG. 6, the output of AND gate 133 enables the angle calculation block 136, which produces the angle information for the negative sequence current alpha plane determination. Multiplexer 140 in FIG. 6 has a similar function to multiplexer 50 in FIG. 5 and switches between the user set minimum pickup value and a pickup value three times the user set value. This is slightly different from that of FIG. 5, which switches between a user set value and a value twice that value. Again, this switching is used because of the expected inrush of charging current during those times that the power line is being energized (after the breaker has been opened and then is closed again), or the remote breaker being closed, which produces the possibility of changing the source of charging current, or the possibility that all three breaker poles for the line will not close simultaneously. Hence, to increase security of the system, the minimum trip threshold is raised when the breaker is being signaled to close. Multiplexer 40 is controlled by the output from OR gate 142. The circuit driving OR gate 142 is identical to that for FIG. 5, with one additional input value for OR gate 142, a signal from another part of the circuit of FIG. 6, discussed below.

Comparators 150, 152, 154 and 156 are used to establish the radius portion (inner and outer boundaries) of the restrain portion of the alpha plane characteristic and the 0.9 quality border area between the inner resulting "nested" portion and the full restrain region. The border area can be varied, as discussed above for the phase comparison portion of the present system.

In the negative sequence quantity arrangement of FIG. 6, there is no open CT alarm signal and hence no CT alarm output signal because high impedance faults during a no-load condition cannot be distinguished from open CT circuits during light loads. The output of AND gate 160 in FIG. 6, which is high when the negative sequence current ratio is within the restrain region, is comparable to the output from AND gate 68 in FIG. 5. The output from AND gate 160 is then applied to a timer 162 and to an inverting input of AND gate 164. The output of timer 162 is applied to another input of AND gate 164, which is also inverting. The output of AND gate 164 is then applied to one input of AND gate 166, along with an output from comparator 168.

The output of AND gate 166 in FIG. 6 is comparable to the output of, with similar input conditions, AND gate 110 in FIG. 5. The output of AND gate 166 in FIG. 6 is applied to a timer 168, the output of which is the trip signal output for the negative sequence differential logic portion of the present invention. The timer 168 has at least two possible pickup values, although more (or fewer) could be provided, either eight or 16 counts in the embodiment shown (½ power cycle or 1 power cycle). In normal operation, the operating count is eight; however, when the control signal to the multiplexer 140 is high, the count increases to 16 for additional security. This count, of course, could be changed, depending upon design considerations. The output of timer 168, being a trip signal, indicates that the current ratio characteristic of the negative sequence current is in the operate region in the alpha plane, as opposed to the restrain region.

Referring still to FIG. 6, the output of AND gate 160 and AND gate 170 are applied to an AND gate 172. This is quite similar to the input and operation of AND gates 68, 98 and 100 in FIG. 5. The logic circuitry from AND gate 172 to timer 174 is identical to that in FIG. 5. A high output from timer 174 indicates that the current ratio is within the quality boundary areas of the restrain region in the alpha plane, warning the user that the system is close to a trip condition for an out-of-section (external) fault.

The combination of the phase differential logic and the negative sequence differential logic provides a reliable, fast, but secure determination of faults on a protected line. The use of negative sequence differential protection in particular provides the desired high ground fault resistance coverage and the security for current CT transformer saturation which the phase differential logic above does not provide. It should be understood, however, that modification to the above circuitry could be made. For instance, zero sequence quantities could be used instead of negative sequence quantities in FIG. 6. The performance is not quite as good but is acceptable. Further, in some cases, positive sequence quantities could be used instead of the phase quantities of FIG. 5 (in combination with the circuit of FIG. 6).

Hence, a system has been disclosed which accurately determines faults on a transmission line using a line differential protection circuit with current values from the local and remote ends of the protected line. The system develops a ratio of remote current to local current, locating the ratio within a current ratio (alpha) plane, the system including a restrain region defined in the alpha plane which can be modified by the user, both in angle and radius values. Phase differential logic is combined with negative sequence differential logic to provide high fault resistance coverage as well as security for CT saturation. The system is thus highly secure, as well as sensitive, so as to make accurate and fast determination of faults while avoiding tripping when a fault has not actually occurred within the protected line section.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A system for current differential protection for a power transmission line, comprising:

means for determining phase current values at local and remote ends of a transmission line;

means for calculating the magnitude value of the ratio of the remote phase current values and the local phase current values;

means for calculating the angle difference value between the remote current and local current values;

comparison elements for comparing the ratio magnitude value and the angle value against preselected values which establish a phase region in a current ratio plane within which tripping of a circuit breaker for the transmission line is restrained, wherein when the ratio magnitude value and angle value are not within the established phase region, an output signal is developed which is a tripping signal for the circuit breaker and wherein when the ratio magnitude value and the angle value are within the established region, no trip signal is produced;

means for determining a selected one of (1) negative sequence current values and (2) zero sequence current values at local and remote ends of the transmission line;

means for calculating the magnitude value of the ratio of the remote selected sequence current values and the local selected sequence current values;

means for calculating the angle difference value between the local and remote selected sequence current values; and comparison elements for comparing the ratio magnitude value and the angle value against preselected values which establish a selected sequence restraint region in the current ratio plane, wherein when the ratio magnitude value and angle value are outside of the sequence region, an output signal is developed which is a tripping signal for the circuit breaker, and wherein when the ratio magnitude value and angle value are within the sequence region, no trip signal is produced.

2. The system of claim 1, wherein the selected sequence current values are negative sequence current values.

3. The system of claim 2, wherein the remote and local phase and negative sequence current values are absolute values.

4. The system of claim 2, including threshold determining circuits which compare the phase and negative sequence current local and remote values against preselected threshold values, wherein said phase and negative sequence current values must exceed said threshold values for said current differential system to be enabled and produce a tripping signal.

5. The system of claim 2, including a comparison element for comparing a difference current value between the remote and local phase current values and remote and local negative sequence current values, respectively, against preselected minimum values of charging current, wherein the preselected values must exceed the maximum charge current values in order for said system to produce a tripping signal.

6. The system of claim 5, wherein the minimum values of charging current vary between two values, depending upon whether or not the line is being energized, and wherein said minimum values are increased when the power transmission line is being energized.

7. The system of claim 6, wherein the increase in said minimum charging current value is at least twice the other minimum value.

8. The system of claim 6, including a timer for extending the time of the increased minimum value by at least $\frac{1}{8}$th of a power system cycle.

9. The system of claim 8, including a second timer which provides protection for the system relative to CT saturation.

10. The system of claim 8, wherein said timer has at least two pickup values and wherein the timer has a longer pickup time when the power line is being energized.

11. The system of claim 2, wherein the preselected values of magnitude and angle are independently adjustable to change the shape and the area of the phase and negative sequence regions in the alpha plane.

12. The system of claim 2, wherein the phase and negative sequence regions each have a nested portion defined therewithin, and wherein said system produces a warning signal when the ratio magnitude and angle are within a boundary between the nested portion and the restraint region.

13. The system of claim 12, wherein a tripping signal is restrained when the ratio magnitude and angle values are within said restraint region, when the system has been enabled by threshold comparisons, and when no other phase differential element or sequence element has provided a trip signal.

14. The system of claim 2, wherein phase current determinations are made for all three phases of current on the power transmission line.

15. The system of claim 2, wherein the current values necessary for operation of the negative sequence element to produce a tripping signal are set substantially lower than the current values necessary for operation of the phase comparison elements.

16. The system of claim 15, wherein the said necessary current values for the negative sequence element are approximately 10% or less of the phase comparison current values.

17. The system of claim 1, wherein the power system includes a tapped load from the power line and means connecting the sum of load and remote negative sequence current to a time overcurrent element for determination of a high impedance ground fault on a low-side of the tapped load.

18. The system of claim 17, wherein the tapped load is a transformer.

19. A system for current differential protection for a power transmission line, comprising:

means for determining positive sequence current values at local and remote ends of a transmission line;

means for calculating the magnitude value of the ratio of the remote positive sequence current values and the local positive sequence current values;

means for calculating the angle difference value between the remote current and local current values;

comparison elements for comparing the ratio magnitude value and the angle value against preselected values which establish a phase region in a current ratio plane within which tripping of a circuit breaker for the transmission line is restrained, wherein when the ratio magnitude value and angle values are not within the established phase region, an output signal is developed which is a tripping signal for-the circuit breaker and wherein when the ratio magnitude value and the angle value are within the established region, no trip signal is produced;

means for determining a selected one of (1) negative sequence current values and (2) zero sequence current values at local and remote ends of the transmission line;

means for calculating the magnitude value of the ratio of the remote selected sequence current values and the local selected sequence current values;

means for calculating the angle difference value between the local and remote selected sequence current values; and comparison elements for comparing the ratio magnitude value and the angle value against preselected values which establish a selected sequence restraint region in the current ratio plane, wherein when the ratio magnitude value and angle value are outside of the selected sequence region, an output signal is developed which is a tripping signal for the circuit breaker, and wherein when the ratio magnitude value and angle value are within the selected sequence region, no trip signal is produced.

20. The system of claim 19, wherein the selected sequence current values are negative sequence current values.

21. The system of claim 19, wherein the remote and local phase and negative sequence current values are absolute values.

22. The system of claim 19, including threshold determining circuits which compare the positive sequence and negative sequence current local and remote values against preselected threshold values, wherein said positive sequence and negative sequence current values must exceed said threshold values for said current differential system to be enabled and produce a tripping signal.

23. The system of claim 21, including a comparison element for comparing a difference current value between the remote and local positive sequence current values and remote and local negative sequence current values, respectively, against preselected minimum values of charging current, wherein the preselected values must exceed the maximum charge current values in order for said system to produce a tripping signal.

24. The system of claim 23, wherein the minimum values of charging current vary between two values, depending upon whether the line is being energized or is energized, and wherein said minimum values are increased when the power transmission line is being energized.

25. The system of claim 21, wherein the preselected values of magnitude and angle are independently adjustable to change the shape and the area of the positive sequence and negative sequence regions in the alpha plane.

26. The system of claim 21, wherein the positive sequence and negative sequence regions each have a nested portion defined therewithin, and wherein said system produces a warning signal when the ratio magnitude and angle value are within a boundary between the nested portion and the restraint region.

27. The system of claim 21, wherein the current values necessary for operation of the negative sequence element to produce a tripping signal are set substantially lower then the current values necessary for operation of the positive sequence comparison elements.

28. The system of claim 27, wherein the said necessary current values for the negative sequence element are approximately 10% or less of the phase comparison current values.

* * * * *